United States Patent
Chu et al.

(10) Patent No.: US 12,035,384 B1
(45) Date of Patent: Jul. 9, 2024

(54) NETWORK IDENTIFIERS FOR WLAN USING MULTIPLE COMMUNICATION LINKS

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 364 days.

(21) Appl. No.: 16/912,641

(22) Filed: Jun. 25, 2020

Related U.S. Application Data

(60) Provisional application No. 62/892,447, filed on Aug. 27, 2019, provisional application No. 62/866,487, filed on Jun. 25, 2019.

(51) Int. Cl.
| | |
|---|---|
| *H04W 4/00* | (2018.01) |
| *H04W 76/11* | (2018.01) |
| *H04W 76/15* | (2018.01) |
| *H04W 84/12* | (2009.01) |

(52) U.S. Cl.
CPC ............ *H04W 76/11* (2018.02); *H04W 76/15* (2018.02); *H04W 84/12* (2013.01)

(58) Field of Classification Search
CPC ...... H04W 76/11; H04W 76/15; H04W 84/12
See application file for complete search history.

(56) References Cited

U.S. PATENT DOCUMENTS

| | | | |
|---|---|---|---|
| 10,257,806 | B2 | 4/2019 | Chu et al. |
| 10,349,413 | B2 | 7/2019 | Zhang et al. |
| 2011/0249659 | A1 | 10/2011 | Fontaine et al. |
| 2016/0212748 | A1 | 7/2016 | Yang et al. |
| 2017/0149547 | A1 | 5/2017 | Kim et al. |
| 2017/0181136 | A1 | 6/2017 | Bharadwaj et al. |
| 2017/0311204 | A1 | 10/2017 | Cariou et al. |
| 2017/0325178 | A1 | 11/2017 | Verma et al. |
| 2017/0366329 | A1 | 12/2017 | Cao et al. |
| 2018/0115403 | A1 | 4/2018 | Sakai et al. |
| 2018/0302858 | A1 | 10/2018 | Son et al. |
| 2019/0123863 | A1 | 4/2019 | Zhang et al. |

(Continued)

FOREIGN PATENT DOCUMENTS

| | | |
|---|---|---|
| EP | 2028809 A2 | 2/2009 |
| EP | 2999252 A1 | 3/2016 |

(Continued)

OTHER PUBLICATIONS

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).

(Continued)

*Primary Examiner* — Omoniyi Obayanju

(57) ABSTRACT

A communication device assigns a first basic service set (BSS) color identifier (ID) to a first communication link among multiple communication links corresponding to multiple frequency segments, and assigns a second BSS color ID to a second communication link among the multiple communication links. The communication device uses the first BSS color ID when communicating via the first communication link, and uses the second BSS color ID when communicating via the second communication link.

14 Claims, 9 Drawing Sheets

(56) References Cited

U.S. PATENT DOCUMENTS

| | | | |
|---|---|---|---|
| 2019/0174577 A1* | 6/2019 | Patil | H04W 76/11 |
| 2019/0182714 A1 | 6/2019 | Chu et al. | |
| 2019/0182863 A1 | 6/2019 | Chu et al. | |
| 2019/0239232 A1* | 8/2019 | Zhou | H04B 17/318 |
| 2019/0349930 A1 | 11/2019 | Chu et al. | |
| 2020/0288323 A1* | 9/2020 | Silverman | H04W 72/046 |
| 2021/0298076 A1* | 9/2021 | Kim | H04W 72/0453 |

FOREIGN PATENT DOCUMENTS

| | | |
|---|---|---|
| GB | 2501898 A | 11/2013 |
| WO | WO-2006/000955 A1 | 1/2006 |
| WO | WO-2012/026779 A2 | 3/2012 |
| WO | WO-2015/099803 A1 | 7/2015 |
| WO | WO-2017/026937 A1 | 2/2017 |
| WO | WO-2017/111567 A2 | 6/2017 |

OTHER PUBLICATIONS

IEEE P802.11ax™M/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages, (Feb. 2019).

IEEE P802.11ax™M/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages, (Oct. 2019).

IEEE Std 802.11-REVmc™M/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

\* cited by examiner

NETWORK IDENTIFIERS FOR WLAN USING MULTIPLE COMMUNICATION LINKS

CROSS REFERENCES TO RELATED APPLICATIONS

This application claims the benefit of U.S. Provisional Patent Application No. 62/866,487, entitled "Multi-Band Operation: Basic Service Set (BSS) and STA Association ID (AID)," filed on Jun. 25, 2019, and U.S. Provisional Patent Application No. 62/892,447, entitled "Multi-Band Operation: Basic Service Set (BSS) and STA Association ID (AID)," filed on Aug. 27, 2019. Both of the applications referenced above are incorporated herein by reference in their entireties.

FIELD OF TECHNOLOGY

The present disclosure relates generally to wireless communication systems, and more particularly to simultaneous transmission and/or reception in multiple frequency segments in a wireless local area network (WLAN).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation of 20 MHz sub-channels in different frequency segments (for example, separated by a gap in frequency) to form respective communication links. Further, the IEEE 802.11be Standard may permit aggregation 20 MHz sub-channels in different radio frequency (RF) bands to form a single aggregate channel, or may permit aggregation of 20 MHz sub-channels in the different RF bands to form respective communication links.

The current IEEE 802.11 Standard (referred to herein as "the IEEE 802.11 Standard" for simplicity) provides for a first communication device to transmit packets to a second communication device via a single communication channel.

The IEEE 802.11 Standard defines an association identifier (AID), which is a network address assigned to a client station by an access point (AP). AIDs and partial AIDs (shortened versions of AIDs) are used by the AP, for example, to identify, within a PHY preamble of a multi-user (MU) packet, the client stations that are intended recipients of the MU packet and to indicate spatial streams and/or frequency resource units (RUs) within a PHY data portion of the packet that correspond to particular client stations.

Because AIDs and/or partial AIDs are included in the PHY header, which has limited capacity, each AID/partial AID is significantly shorter (e.g., AID=sixteen bits, partial AID=12 bits) than a MAC address (e.g., 48 bits), and each AID/partial AID is not globally unique.

The IEEE 802.11ax Standard defines a basic service set (BSS) color, or BSS color identifier (ID), which identifies a BSS. Packets transmitted in a BSS include the BSS color ID in a physical layer (PHY) preamble. The BSS color ID assists client stations that receive a packet to quickly identify a BSS from which the packet originates. For example, if a client station determines, using the BSS color ID, that the packet is from another BSS, the client station may decide to transmit another packet within the BSS while the packet from the other BSS is being transmitted (sometimes referred to as a "spatial reuse" transmission) rather than waiting for the transmission of the packet from the other BSS to end. As another example, if a client station determines, using the BSS color ID, that the packet is from another BSS, the client station may decide to go into a power save mode at least until transmission of the packet from the other BSS ends. Because the BSS color ID is in the PHY preamble of the packet, determining whether the packet is from another BSS can be performed more quickly as compared to examining a media access control (MAC) address in a MAC header within the packet.

Because the BSS color ID is included in the PHY header, which has limited capacity, the BSS color ID is significantly shorter (e.g., six bits) than a MAC address (e.g., 48 bits). Because the BSS color ID is significantly shorter (e.g., six bits) than a MAC address, the BSS color ID is not globally unique, multiple neighboring networks may attempt to use the same BSS color (referred to as a BSS color "collision"). Therefore, the IEEE 802.11ax Standard provides mechanisms for detecting BSS color collisions and changing a BSS color ID when a BSS color collision is detected, for example.

SUMMARY

In an embodiment, a method for simultaneously communicating in multiple frequency segments corresponding to respective communication links includes: assigning, at a communication device, a first basic service set (BSS) color identifier (ID), or BSSID, to a first communication link among the multiple communication links; assigning, at the communication device, a second BSS color ID to a second communication link among the multiple communication links; using, at the communication device, the first BSS color ID when communicating via the first communication link; and using, at the communication device, the second BSS color ID when communicating via the second communication link.

In another embodiment, a communication device comprises a wireless network interface device that is configured to communicate via multiple frequency segments. The wireless network interface device includes one or more integrated circuit (IC) devices configured to: assign a first BSSID to a first communication link among multiple communication links corresponding to respective frequency segments; assign a second BSS color ID to a second communication link among the multiple communication links; use the first BSS color ID when communicating via the first communication link; and use the second BSS color ID when communicating via the second communication link.

In yet another embodiment, a method for communicating configuration information and/or operating parameters in a wireless network utilizing multiple communication links corresponding to respective frequency segments includes: generating, at a communication device, a frame that includes capability information and/or operating parameters corresponding to the multiple communication links; and transmitting, by the communication device, the frame in a single communication link among the multiple communication links.

In still another embodiment, a communication device comprises a wireless network interface device that is configured to communicate via multiple frequency segments. The wireless network interface device includes one or more IC devices configured to: generate a frame that includes capability information and/or operating parameters corresponding to the multiple communication links corresponding to respective frequency segments; and transmit the frame in a single communication link among the multiple communication links.

DETAILED DESCRIPTION

A next generation wireless local area network (WLAN) protocol (e.g., the IEEE 802.11be Standard, sometimes referred to as the Extremely High Throughput (EHT) WLAN Standard) may permit aggregation of as many as sixteen (or perhaps even more) 20 MHz sub-channels to form 320 MHz aggregate communication channels (or perhaps even wider aggregate communication channels). Additionally, the IEEE 802.11be Standard may permit aggregation of 20 MHz sub-channels in different frequency segments (for example, separated by a gap in frequency) to form respective communication links. Additionally, the IEEE 802.11be Standard may permit the formation of multiple WLAN communication links corresponding to respective frequency segments. The multiple WLAN communication links may be used to simultaneously transmit/receive different information.

In some embodiments described below, an access point (AP) simultaneously communicates via multiple frequency segments corresponding to multiple communication links, and the AP assigns different basic service set (BSS) color identifiers (IDs) for the different communication links. The ability of the AP to assign different BSS color IDs for different communication links provides the AP with more flexibility in choosing BSS color IDs in the presence of neighboring networks, at least in some embodiments.

In some embodiments described below, an AP and a client station simultaneously communicate via multiple frequency segments corresponding to multiple communication links, and the AP assigns to the client station a single association identifier (AID) for all of the communication links. The assigning of a single AID to a client station for all communication links used by the client station reduces the amount of management and/or control information exchanged between the AP and client stations, which improves data throughput, at least in some embodiments.

Figure 1:
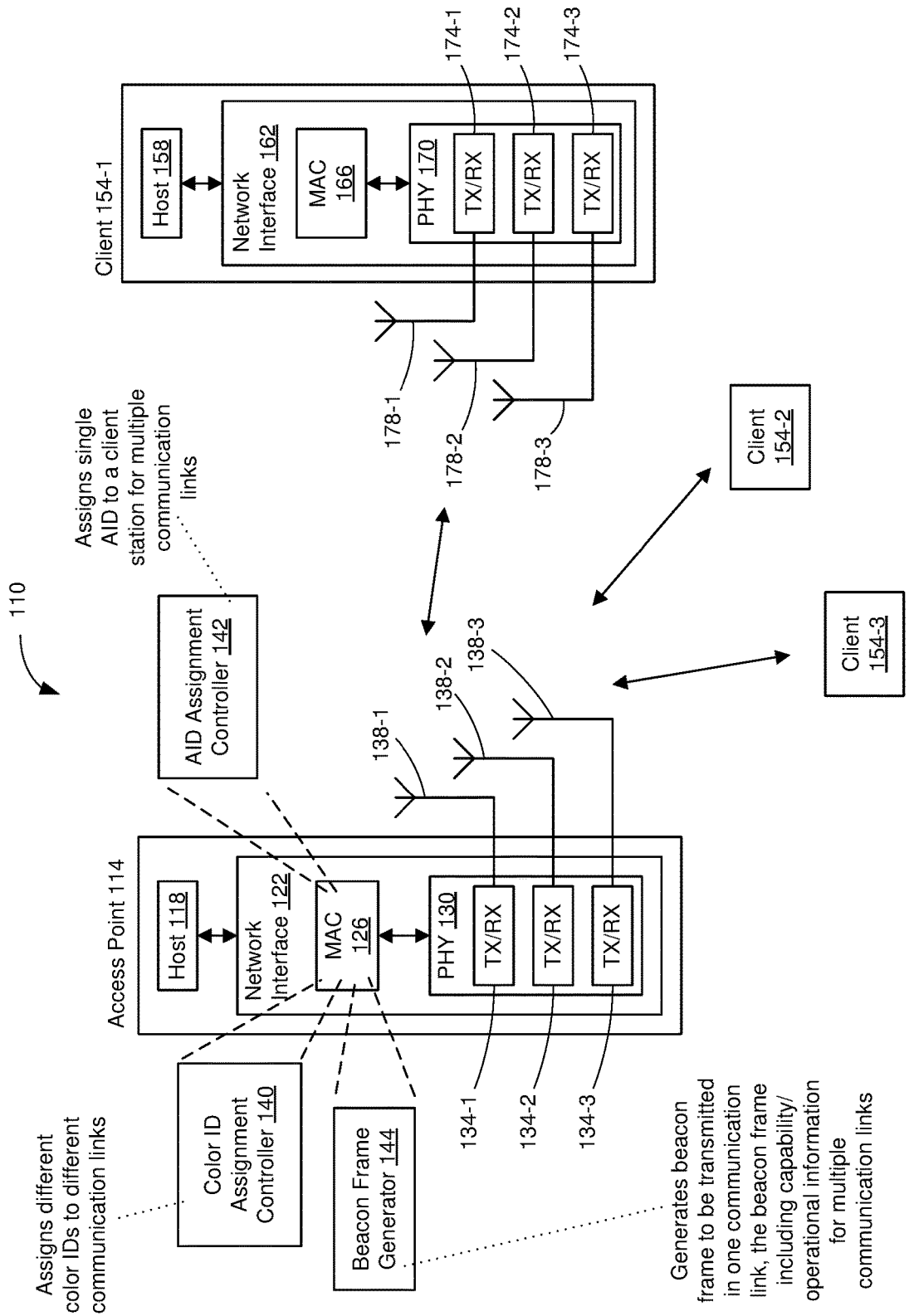
FIG. 1 is a block diagram of an example communication system in which an access point (AP) and client stations wirelessly exchange information via multiple frequency segments, according to an embodiment.

FIG. 1 is a diagram of an example WLAN 110 that uses multiple communication links in multiple frequency segments, according to an embodiment. The multiple communication links are within a single RF band or within multiple RF bands, in various embodiments. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to simultaneously communicate via multiple communication links in respective frequency segments within a single RF band, and/or to communicate via the multiple communication links at different times. In another embodiment, the wireless network interface device 122 is additionally configured for operation within two or more RF bands at the same time or at different times. For instance, in an embodiment, the wireless network interface device 122 is configured to simultaneously communicate via multiple communication links in respective RF bands, and/or to communicate via the multiple communication links at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), PHY service data units (PSDUs), etc., and provide the MAC layer data units to the PHY processor 130. As an example, the MAC processor 126 is configured to generate MAC layer data units that include configuration information and/or operating parameters for the network 110, and to prompt the PHY processor 130 to transmit to MAC layer data units to client stations within PHY data units, according to some embodiments. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to select BSS color IDs for the different communication links and to select AIDs for client stations in the network 110, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames" or PSDUs.

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a ROM, a flash memory, etc. In other embodiments, the MAC processor 126 additionally or alternatively includes one or more hardware state machines.

The MAC processor 126 includes, or implements, a BSS color ID assignment controller 140 that is configured to assign BSS color IDs to multiple communication links corresponding to the network 110, according to some embodiments. In various embodiments, BSS color ID assignment controller 140 performs various acts related to the BSS color ID assignment, as will be described in more detail below.

In an embodiment, the BSS color ID assignment controller 140 is implemented by a processor executing machine readable instructions stored in a memory, where the machine readable instructions cause the processor to perform acts related to BSS color ID assignment described in more detail below. In another embodiment, the BSS color ID assignment controller 140 additionally or alternatively comprises hardware circuitry (e.g., one or more hardware state machines, etc.) that is configured to perform acts related to BSS color ID assignment described in more detail below. In some embodiments in which the hardware circuitry comprises one or more hardware state machines, the one or more hardware state machines are configured to perform acts described in more detail below.

Additionally or alternatively, the MAC processor 126 includes, or implements, an AID assignment controller 142 that is configured to assign AIDs to client stations in the network 110, according to an embodiment. For example, the AID assignment controller 142 assign a single AID to a client station for multiple communication links, according to an embodiment.

In an embodiment, the AID assignment controller 142 is implemented by a processor executing machine readable instructions stored in a memory, where the machine readable instructions cause the processor to perform acts described in more detail below. In another embodiment, the AID assignment controller 142 additionally or alternatively comprises hardware circuitry that is configured to perform acts described in more detail below. In some embodiments, the hardware circuitry comprises one or more hardware state machines that are configured to perform acts described in more detail below.

Additionally or alternatively, the MAC processor 126 includes, or implements, a beacon frame generator 144 that is configured to generate beacon frames for transmission to client stations in the network 110, according to an embodiment. In an embodiment, the beacon frame generator 144 generates a beacon frame to be transmitted only via one communication link, where the beacon frame includes capability information and/or operational information for multiple communication links. In some embodiments, the beacon frame generator 144 generates respective beacon frames to be transmitted only via respective communication links, where each respective beacon frame includes capability information and/or operational information for multiple communication links.

In an embodiment, the beacon frame generator 144 is implemented by a processor executing machine readable instructions stored in a memory, where the machine readable instructions cause the processor to perform acts described in more detail below. In another embodiment, the beacon frame generator 144 additionally or alternatively comprises hardware circuitry that is configured to perform acts described in more detail below. In some embodiments, the hardware circuitry comprises one or more hardware state machines that are configured to perform acts described in more detail below.

In other embodiments, one or more of the color ID assignment controller 140, the AID assignment controller 142, and the beacon frame generator 144 are omitted from the AP 114.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
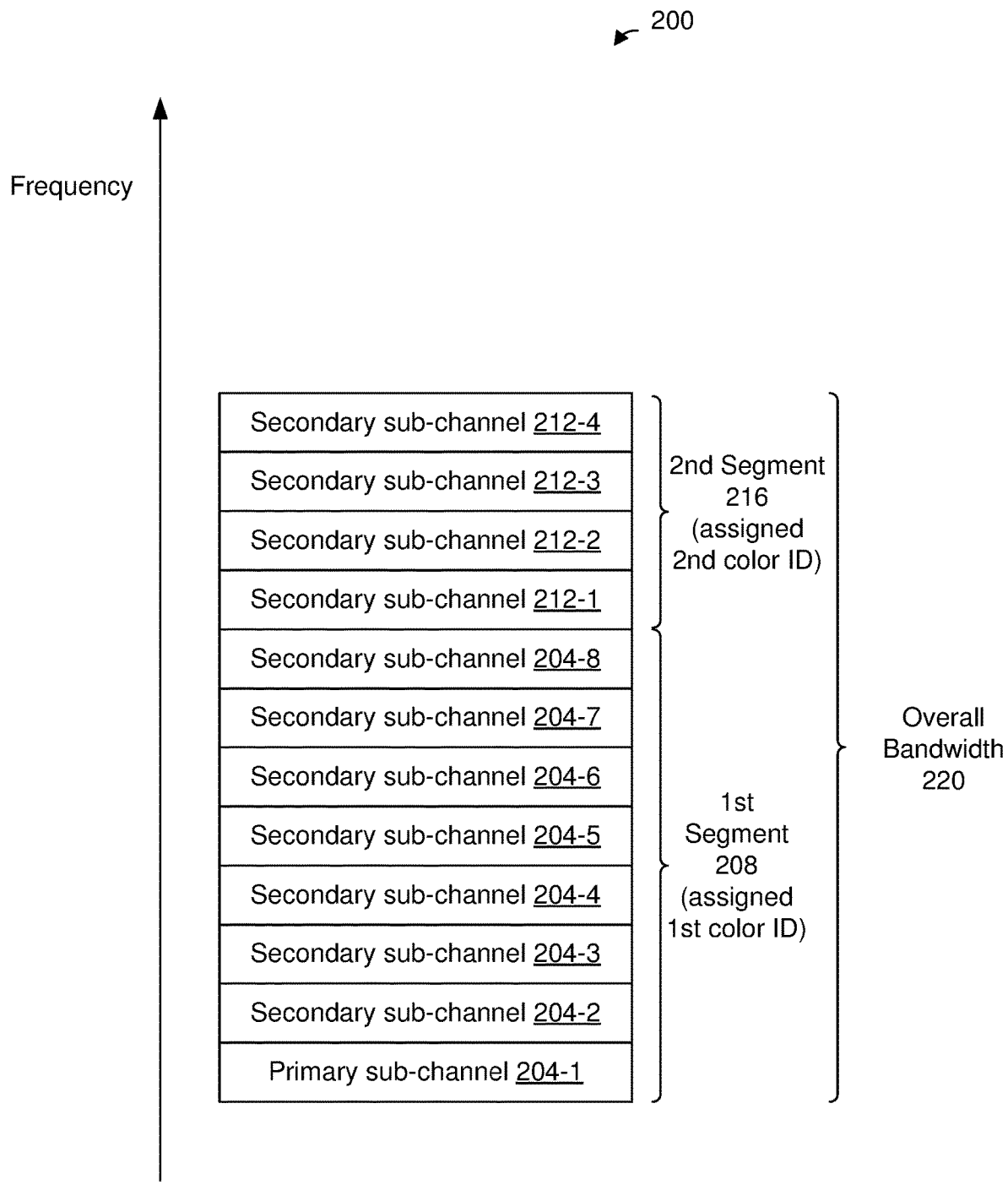
FIG. 2A is a diagram of an example communication channel used by the communication system of FIG. 1, the communication channel corresponding to multiple frequency segments, according to an embodiment.

FIG. 2A is a diagram of an example operating channel 200 that is used in the communication system 110 of FIG. 1, according to an embodiment. The operating channel 200 comprises a plurality of subchannels 204 in a first frequency segment 208 and a plurality of subchannels 212 in a second frequency segment 216. The operating channel 200 spans an overall bandwidth 220. In an embodiment, the first segment 208 and the second segment 216 are within a same RF band.

In other embodiments, the first segment 208 and the second segment 216 are in different RF bands. The Federal Communication Commission (FCC) now permits WLANs to operate in multiple RF bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Regulatory agencies in other countries/regions also permit WLAN operation in the 2.4 GHz and 5 GHz bands, and are considering permitting WLAN operation in the 6 GHz band. A future WLAN protocol, now under development, may permit multi-band operation in which a WLAN can use spectrum in multiple RF bands at the same time.

In some embodiments, the first frequency segment 208 is used as a first communication link and the second frequency segment 216 is used as a second communication link, where the first communication link and the second communication link are used for simultaneous transmissions. In some embodiments, the AP 114 assigns (e.g., the network interface 122 assigns, the MAC processor 126 assigns, the color ID assignment controller 140 assigns, etc.) different BSS color IDs to the first frequency segment 208 and the first frequency segment 216. In other embodiments, the AP 114 assigns (e.g., the network interface 122 assigns, the MAC processor 126 assigns, the color ID assignment controller 140 assigns, etc.) a same BSS color ID to the first frequency segment 208 and the first frequency segment 216. The AP 114 transmits (e.g., the network interface 122 transmits, the PHY processor 130 transmits, etc.) to the client stations 154 indicator(s) of the BSS color ID(s) to the first frequency segment 208 and the first frequency segment 216.

In one embodiment, each of the subchannels 204/212 spans 20 MHz. Thus, as illustrated in FIG. 2A, the first segment 208 spans 160 MHz and the second segment 216 spans 80 MHz. In other embodiments, the first frequency segment 208 includes another suitable number of subchannels 204 (e.g., one, two, four, etc.) and spans another suitable bandwidth, such as 20 MHz, 40 MHz, 80 MHz, etc., and/or the second frequency segment 216 includes another suitable number of subchannels 212 (e.g., one, two, eight, etc.) and spans another suitable bandwidth, such as 20 MHz, 40 MHz, 160 MHz, etc.

One subchannel 204-1 in the first frequency segment 208 is designated as a primary subchannel and the other subchannels 204/212 are designated as secondary subchannels. Control and/or management frames are transmitted in the primary subchannel 204-1, according to some embodiments. As an illustrative example, beacon frames are transmitted in the primary subchannel 204-1. In some embodiments, the primary subchannel must be idle in order for any of the subchannels 204/212 to be used for a transmission, according to some embodiments. In some embodiments, a subchannel 212 in the second frequency segment 216 is also designated as a primary subchannel (not shown). In some embodiments in which the second frequency segment 216 also includes a primary subchannel, control and/or management frames are additionally or alternatively transmitted in the primary subchannel of the second frequency segment 216, at least in some scenarios. In other embodiments, control and/or management frames are only transmitted in the primary subchannel 204-1 of the first frequency segment 208.

In some embodiments in which the second frequency segment 216 also includes a primary subchannel, the primary subchannel 204-1 of the first frequency segment 208 must be idle in order for any of the subchannels 204 to be used for a transmission and the primary subchannel of the second frequency segment 216 must be idle in order for any of the subchannels 212 to be used for a transmission, according to some embodiments. In other embodiments, one or more of the secondary subchannels 204 may be used for a transmission even when the primary subchannel 204-1 is not idle, and/or one or more of the secondary subchannels 212 may be used for a transmission even when the primary subchannel of the second frequency segment 216 is not idle, according to some embodiments.

In other embodiments, no subchannel 212 in the second segment 216 is designated as a primary subchannel.

Figure 2B:
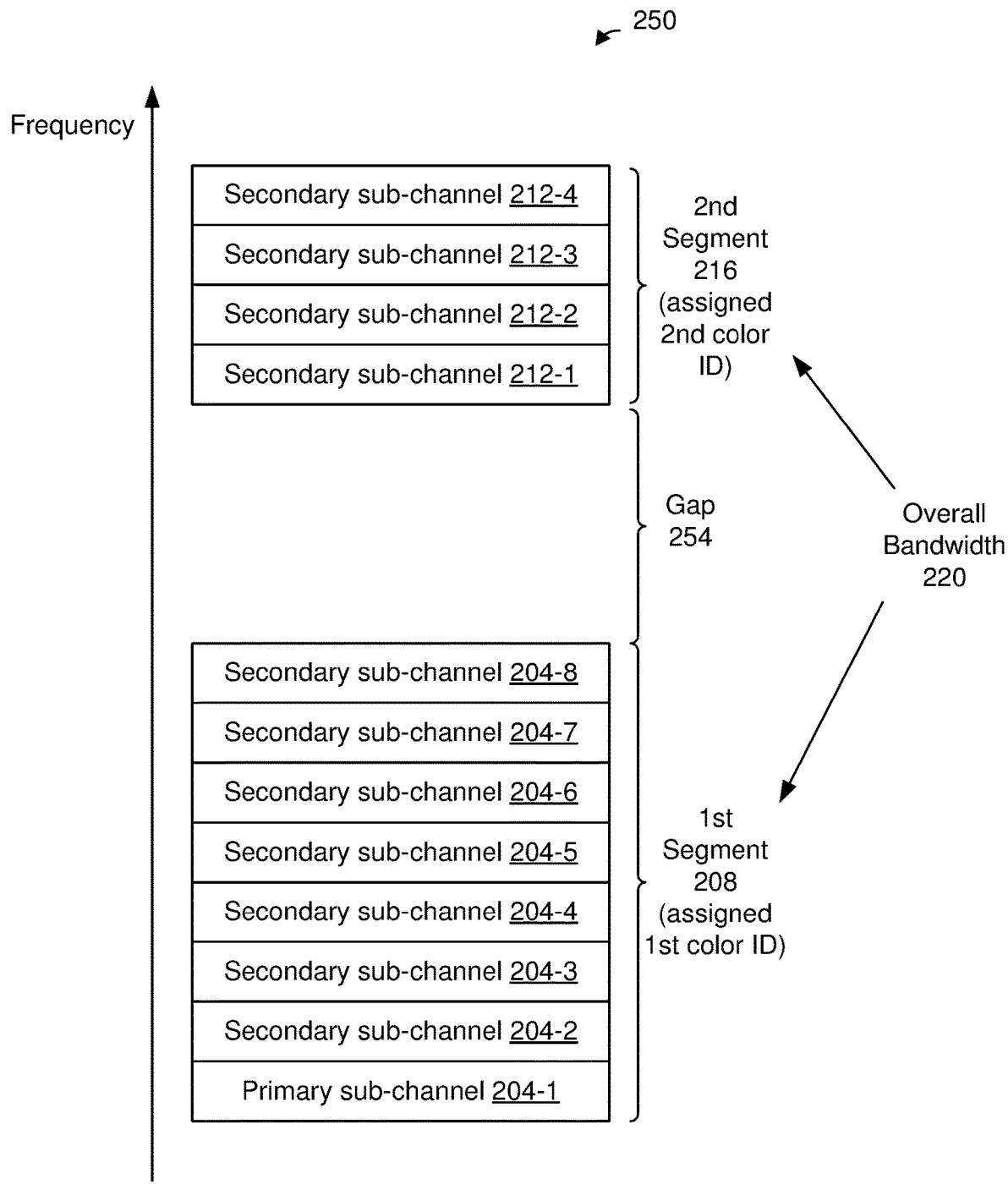
FIG. 2B is a diagram of another example communication channel used by the communication system of FIG. 1, the communication channel corresponding to multiple frequency segments, according to another embodiment.

FIG. 2B is a diagram of another example operating channel 250 that is used in the communication system 110 of FIG. 1, according to another embodiment. The operating channel 250 is similar to the example operating channel 200 of FIG. 2A, and like-numbered elements are not described in detail for brevity. In the example operating channel 250 the first frequency segment 208 and the second frequency segment 216 are separated by a gap 254 in frequency. In some embodiments, the first frequency segment 208 and the second frequency segment 216 are in a same RF band. In other embodiments, the first frequency segment 208 and the second frequency segment 216 are in different RF bands.

Referring now to FIGS. 2A and 2B, one or more of the subchannels 204/212 are "punctured" (not shown in FIGS. 2A and 2B, e.g., nothing is transmitted within the "punctured" subchannels, according to some embodiments.

Although the example operating channels 200 and 250 of FIGS. 2A-B are illustrated as including two frequency segments 208/216, other suitable operating channels include three or more frequency segments (e.g., include a third frequency segment, include a third frequency segment and a fourth frequency segment, etc.). In some embodiments, a third frequency segment is separated from the second frequency segment 216 by a gap in frequency in which nothing is transmitted, similar to the gap 254. In some embodiments, a third frequency segment is contiguous in frequency with the second frequency segment 216.

In some embodiments, respective frequency segments such as illustrated in FIGS. 2A-B are associated with different MAC addresses. For example, in embodiments in which the respective frequency segments are uses as respective communication links, the respective communication links correspond to different MAC addresses.

Figure 3:
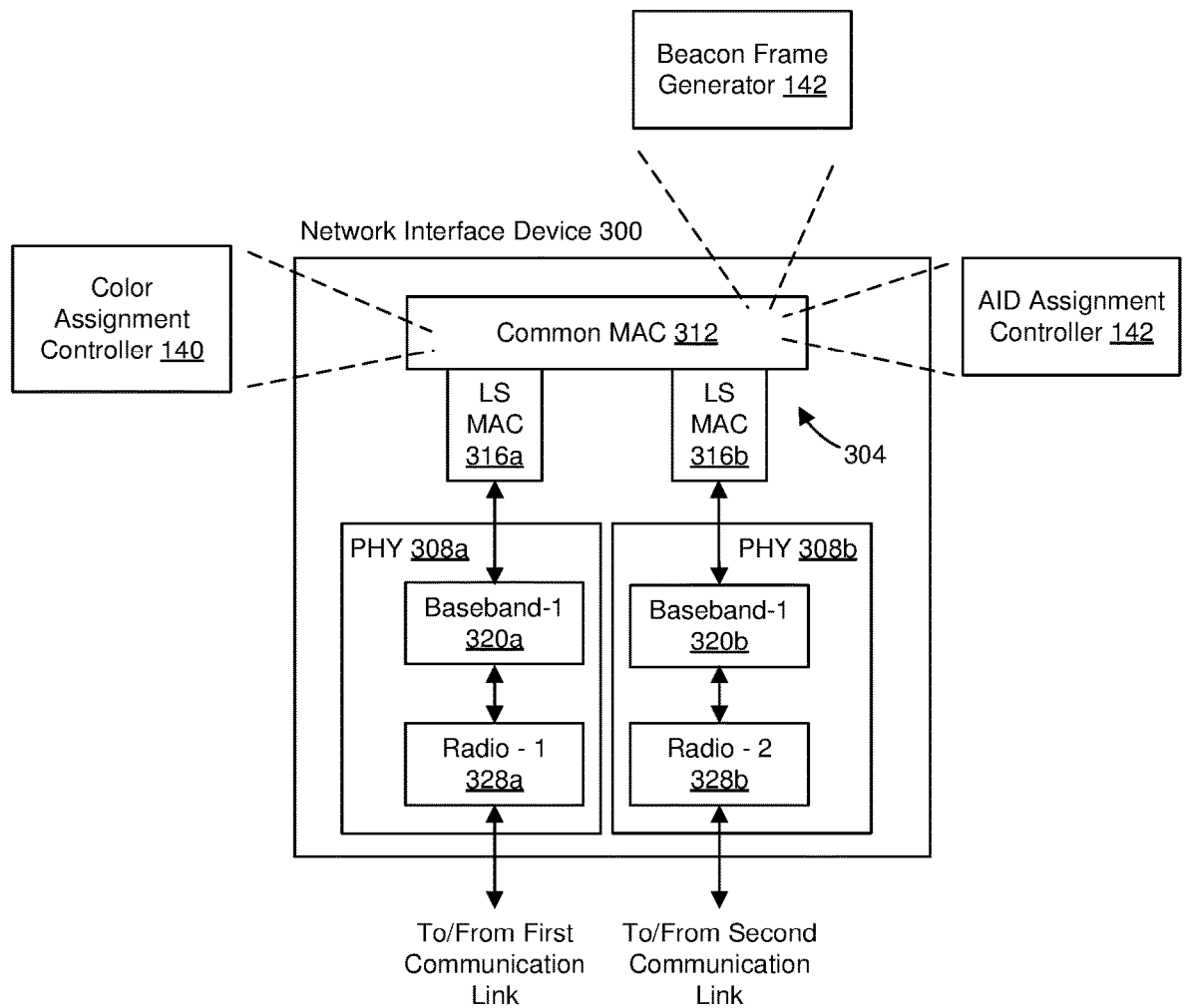
FIG. 3 is a block diagram of an example wireless network interface device, of one or more communication devices of the communication system of FIG. 1, that is configured to communicate via multiple frequency segments, according to an embodiment.

FIG. 3 is a diagram of an example network interface device 300 configured for simultaneous communication via multiple communication links in respective frequency segments, according to an embodiment. The network interface device 300 is an embodiment of the network interface device 122 of the AP 114 of Fig. The network interface device 300 is an embodiment of the network interface device 162 of the client station 154-1 of FIG. 1. In other embodiments, network interface device 122 and/or the network interface device 162 have a different suitable structure than the network interface device 300. Additionally, in some embodiments, the network interface device 300 is used in another suitable communication device than the communication devices of FIG. 1, and/or is used in another suitable wireless network than the wireless network of FIG. 1.

The network interface device 300 is configured for simultaneous communication via a first communication link in a first frequency segment and a second communication link in a second frequency segment, in the illustrated embodiment.

The network interface device 300 includes a MAC processor 304 coupled to a PHY processors 308. The MAC processor 304 exchanges frames (or PSDUs) with the PHY processors 308.

In an embodiment, the MAC processor 304 corresponds to the MAC processor 126 of FIG. 1. In another embodiment, the MAC processor 304 corresponds to the MAC processor 166 of FIG. 1. In an embodiment, the PHY processors 308 corresponds to the one or more PHY processors 130 of FIG. 1. In another embodiment, the PHY processors 308 corresponds to the one or more PHY processors 170 of FIG. 1.

The MAC processor 304 includes common MAC logic 312 and link specific (LS) MAC logic 316. The common MAC logic 312 generally implements MAC layer functions that are common to the multiple communication links. For instance, the common MAC logic 312 is configured to, in response to receiving data (e.g., from a host processor (not shown), from a wired communication link (not shown), etc.) that is to be forwarded to another communication device in the WLAN, encapsulate the data in MAC layer data units such as MSDUs, MPDUs, aggregate MPDUs (A-MPDUs), etc., for transmission via the multiple communication links and to decapsulate data from MSDUs, MPDUs, A-MPDUs, etc., that were received via the multiple communication links. Additionally, the common MAC logic 312 is configured to select communication links via which MAC layer data units should be transmitted, in some embodiments.

Each LS MAC logic 316 generally implements MAC layer functions that are specific to the particular communication link to which the LS MAC logic 316 corresponds. For example, the LS MAC logic 316*a* is configured to determine when the first communication link is idle and available for transmission, and the LS MAC logic 316*b* is configured to determine when the second communication link is idle and available for transmission, in some embodiments. In some embodiments, each LS MAC logic 316 is associated with a respective network address (e.g., a MAC address), i.e., the LS MAC logic 316*a* is associated with a first network address (e.g., a first MAC address) and the LS MAC logic 316*a* is associated with a second network address (e.g., a second MAC address) that is different than the first network address.

In some embodiments, the common MAC logic 312 implements the BSS color ID assignment controller 140 discussed above with reference to FIG. 1. In some embodiments, some or all of the BSS color ID assignment controller 140 is implemented as respective link specific BSS color ID assignment controllers 140 in respective LS MAC logic 316.

In some embodiments, the common MAC logic 312 additionally or alternatively implements the AID assignment controller 142 discussed above with reference to FIG. 1. In some embodiments, the common MAC logic 312 additionally or alternatively implements the beacon frame generator 146 discussed above with reference to FIG. 1.

The PHY processor 308*a* includes a baseband signal processor 320*a* corresponding to the first communication link, and the PHY processor 308*b* includes a baseband signal processor 320*b* corresponding to the second communication link. The PHY processor 308a also includes a first RF radio (Radio-1) 328a corresponding to the first communication link, and the PHY processor 308b includes a second RF radio (Radio-2) 328b corresponding to the second communication link. The baseband signal processor 320a is coupled to the first RF radio 328a and the baseband signal processor 320b is coupled to the second RF radio 328b. In an embodiment, the RF radio 328a and the RF radio 328b correspond to the transceivers 134 of FIG. 1. In another embodiment, the RF radio 328a and the RF radio 328b correspond to the transceivers 174 of FIG. 1. In an embodiment, the RF radio 328a is configured to operate on a first RF band, and the RF radio 328b is configured to operate on a second RF band. In another embodiment, the RF radio 328a and the RF radio 328b are both configured to operate on the same RF band.

In an embodiment, the baseband signal processors 320 are configured to receive frames (or PSDUs) from the MAC processor 304, and encapsulate the frames (or PSDUs) into respective packets and generate respective baseband signals corresponding to the respective packets.

The baseband signal processor 320a provides the respective baseband signal generated by the baseband signal processor 320a to the Radio-1 328a. The baseband signal processor 320b provides the respective baseband signal generated by the baseband signal processor 320b to the Radio-1 328b. The Radio-1 328a and Radio-2 328b upconvert the respective baseband signals to generate respective RF signals for transmission via the first communication link and the second communication link, respectively. The Radio-1 328a transmits a first RF signal via the first frequency segment and the Radio-2 328b transmits a second RF signal via the second frequency segment.

The Radio-1 328a and the Radio-2 328b are also configured to receive respective RF signals via the first communication link and the second communication link, respectively. The Radio-1 328a and the Radio-2 328b generate respective baseband signals corresponding to the respective received signals. The generated respective baseband signals are provided to the respective baseband signal processors 320a and 320b. The respective baseband signal processors 320a and 320b generate respective PSDUs corresponding to the respective received signals, and provide the respective PSDUs to the MAC processor 304. The MAC processor 304 processes the PSDUs received from the baseband signal processors 320a and 320b, in an embodiment.

In some embodiments, the common MAC logic 312 and/or the LS MAC logic 316 are implemented, at least partially, by a processor configured to execute machine readable instructions stored in a memory device (not shown) such as a RAM, a ROM, a flash memory, etc. In other embodiments, the common MAC logic 312 and/or the LS MAC logic 316 are implemented, additionally or alternatively, by hardware logic such as one or more hardware state machines.

In some embodiments, the baseband signal processors 320 are implemented, at least partially, by a processor configured to execute machine readable instructions stored in a memory device (not shown) such as a RAM, a ROM, a flash memory, etc. In other embodiments, the baseband signal processors 320 are implemented, additionally or alternatively, by hardware logic such as one or more hardware state machines, hardware calculators (e.g., FFT calculators, IFFT calculators), hardware modulators, etc.

Although the example network interface 300 illustrated in FIG. 3 includes a single MAC processor 304, other suitable network interface devices include multiple MAC processors, with respective ones of the multiple MAC processors 304 corresponding to respective ones of the communication links, in some embodiments. Although the example network interface 300 illustrated in FIG. 3 includes multiple PHY processors 308, other suitable network interface devices include a single PHY processor with multiple RF radios corresponding to respective ones of the communication links, in some embodiments. In some embodiments, the single PHY processor includes multiple baseband processors 320, while in other embodiments the single PHY processor includes a single baseband processor that is configured to generate multiple baseband signals corresponding to respective communication links, and to process multiple baseband signals received from the multiple RF radios.

Figure 4:
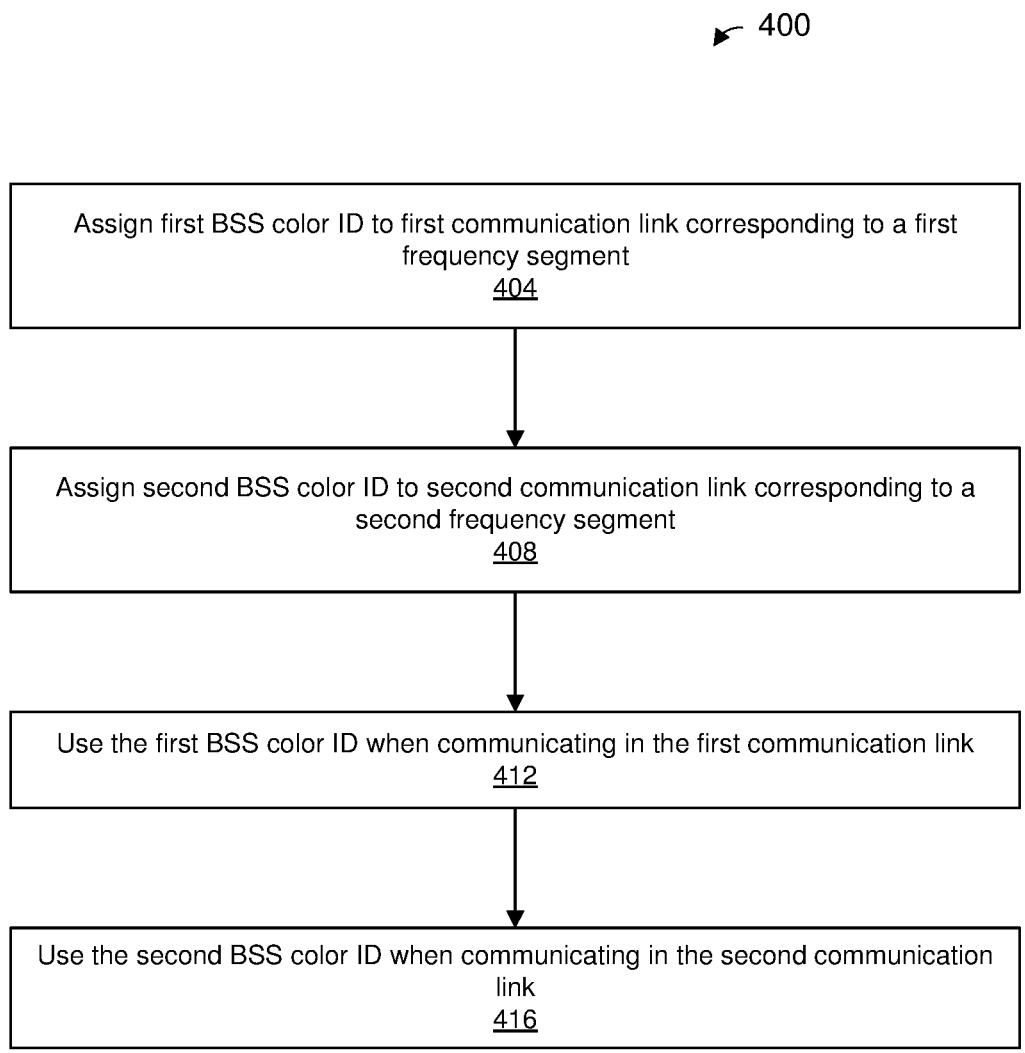
FIG. 4 is a flow diagram of an example method, implemented by one or more communication devices of the communication system of FIG. 1, for simultaneously communicating in multiple frequency segments corresponding to respective communication links, according to an embodiment.

FIG. 4 is a flow diagram of an example method 400 for simultaneously communicating in multiple frequency segments corresponding to respective communication links, according to an embodiment. In some embodiments, the AP 114 of FIG. 1 and/or the network interface device 300 of FIG. 3 is/are configured to implement the method 400, and FIG. 4 is described with reference to FIGS. 1 and 3 merely for explanatory purposes. In other embodiments, the method 400 is implemented by another suitable communication device.

At block 404, the AP 114 assigns (e.g., the network interface device 122 assigns, the MAC processor 126 assigns, the BSS color ID assignment controller 140 assigns, the network interface device 300 assigns, the common MAC logic 312 assigns, etc.) a first BSS color ID to a first communication link among the multiple communication links. In some embodiments, assigning the first BSS color ID to the first communication link at block 404 includes the AP 114 transmitting (e.g., the network interface device 122 transmitting, the PHY processor 130 transmitting, the network interface device 300 transmitting, etc.) in the first communication link a frame that includes an indication of an assignment of the first BSS color ID to the first communication link. In an embodiment, the frame is a beacon frame transmitted in the first communication link.

At block 408, the AP 114 assigns (e.g., the network interface device 122 assigns, the MAC processor 126 assigns, the BSS color ID assignment controller 140 assigns, the network interface device 300 assigns, the common MAC logic 312 assigns, etc.) a second BSS color ID to a second communication link among the multiple communication links. In some embodiments, assigning the second BSS color ID to the second communication link at block 408 includes the AP 114 transmitting (e.g., the network interface device 122 transmitting, the PHY processor 130 transmitting, the network interface device 300 transmitting, etc.) in the second communication link a frame that includes an indication of an assignment of the second BSS color ID to the second communication link. In an embodiment, the frame is a beacon frame transmitted in the second communication link.

At block 412, the AP 114 uses (e.g., the network interface device 122 uses, the network interface device 300 uses, etc.) the first BSS color ID when communicating via the first communication link. In an embodiment, using the first BSS color ID when communicating via the first communication link at block 412 comprises generating and transmitting (e.g., the network interface device 122 generates and transmits, the PHY processor 130 generates and transmits, the network interface device 300 generates and transmits, etc.) via the first communication link packets that include the first BSS color ID in PHY preambles of the packets. In an embodiment, using the first BSS color ID when communicating via the first communication link at block 412 comprises receiving (e.g., the network interface device 122 receives, the PHY processor 130 receives, the network interface device 300 receives, etc.) via the first communication link packets that include the first BSS color ID in PHY preambles of the packets.

At block 416, the AP 114 uses (e.g., the network interface device 122 uses, the network interface device 300 uses, etc.) the second BSS color ID when communicating via the second communication link. In an embodiment, using the second BSS color ID when communicating via the second communication link at block 416 comprises generating and transmitting (e.g., the network interface device 122 generates and transmits, the PHY processor 130 generates and transmits, the network interface device 300 generates and transmits, etc.) via the second communication link packets that include the second BSS color ID in PHY preambles of the packets. In an embodiment, using the second BSS color ID when communicating via the second communication link at block 412 comprises receiving (e.g., the network interface device 122 receives, the PHY processor 130 receives, the network interface device 300 receives, etc.) via the second communication link packets that include the second BSS color ID in PHY preambles of the packets.

In an embodiment, using the second BSS color ID when communicating via the second communication link at block 416 overlaps in time with using the first BSS color ID when communicating via the first communication link at block 412. For example, in an embodiment, a first packet having the first BSS color ID in a PHY preamble is transmitted via the first communication link while a second packet having the second BSS color ID in a PHY preamble is transmitted or received via the second communication link. As another example, in an embodiment, a first packet having the first BSS color ID in a PHY preamble is received via the first communication link while a second packet having the second BSS color ID in a PHY preamble is transmitted or received via the second communication link.

In some embodiments, the method 400 further includes the AP 114 assigning (e.g., the network interface device 122 assigns, the MAC processor 126 assigns, the BSS color ID assignment controller 140 assigns, the network interface device 300 assigns, the common MAC logic 312 assigns, etc.) a third BSS color ID to the first communication link without changing the assignment of the second BSS color ID to the second communication link. For example, in response to the AP 114 receiving (e.g., from a client station 154) an indication of a color collision regarding the first BSS color ID and the first communication link, the AP 114 assigns (e.g., the network interface device 122 assigns, the MAC processor 126 assigns, the BSS color ID assignment controller 140 assigns, the network interface device 300 assigns, the common MAC logic 312 assigns, etc.) the third BSS color ID to the first communication link without changing the assignment of the second BSS color ID to the second communication link.

Figure 5:
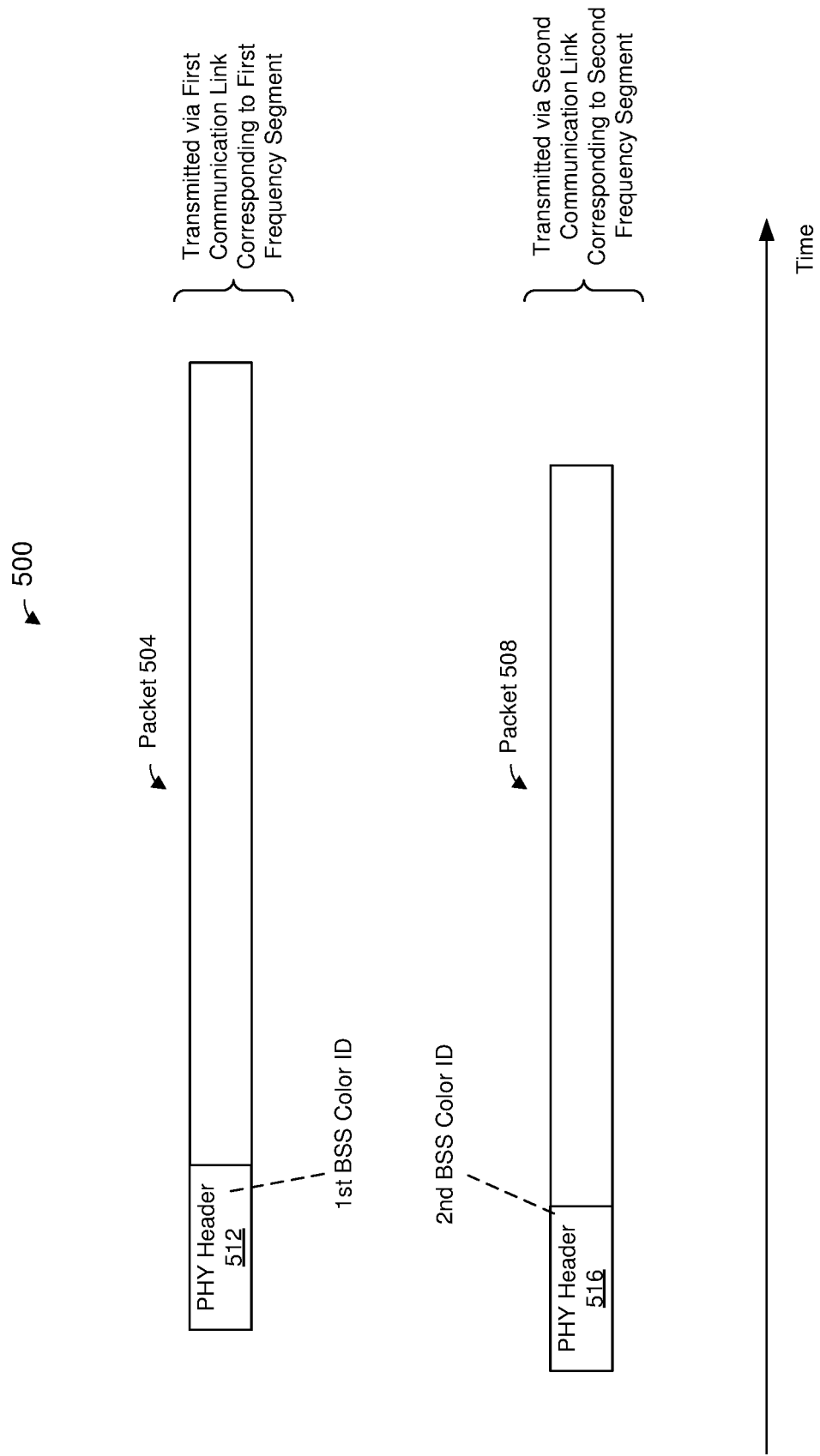
FIG. 5 is a diagram of example transmissions via multiple frequency segments corresponding to respective communication links performed in connection with the method of FIG. 4, according to an embodiment.

FIG. 5 is a diagram of example transmissions 500 via multiple frequency segments corresponding to respective communication links, according to an embodiment. The example transmissions 500 are an illustrative example of i) using the first BSS color ID when communicating via the first communication link at block 412 (FIG. 4), and ii) using the second BSS color ID when communicating via the second communication link at block 416 (FIG. 4), according to an embodiment.

A first packet 504 is transmitted via a first communication link corresponding to a first frequency segment, and a second packet 508 is transmitted via a second communication link corresponding to a second frequency segment. Transmission of the first packet 504 overlaps in time with transmission of the second packet 508. In an embodiment, the AP 114 transmits the first packet 504 and the second packet 508. In another embodiment, the AP 114 transmits the first packet 504 and receives the second packet 508.

The first packet 504 includes a PHY header 512, and the second packet 508 includes a PHY header 516. The PHY header 512 of the first packet 504 includes a color subfield having a first BSS color ID, and the PHY header 516 of the second packet 508 includes a color subfield having a second BSS color ID, which is different than the first BSS color ID, according to an embodiment.

Although FIGS. 4 and 5 were described in the context of two communication links in two frequency segments, the AP assigns three or more different BSS color IDs to three or more communication links corresponding to three or more frequency segments, and uses the three or more different BSS color IDs when respectively communicating via the three or more communication links, according to other embodiments.

Figure 6:
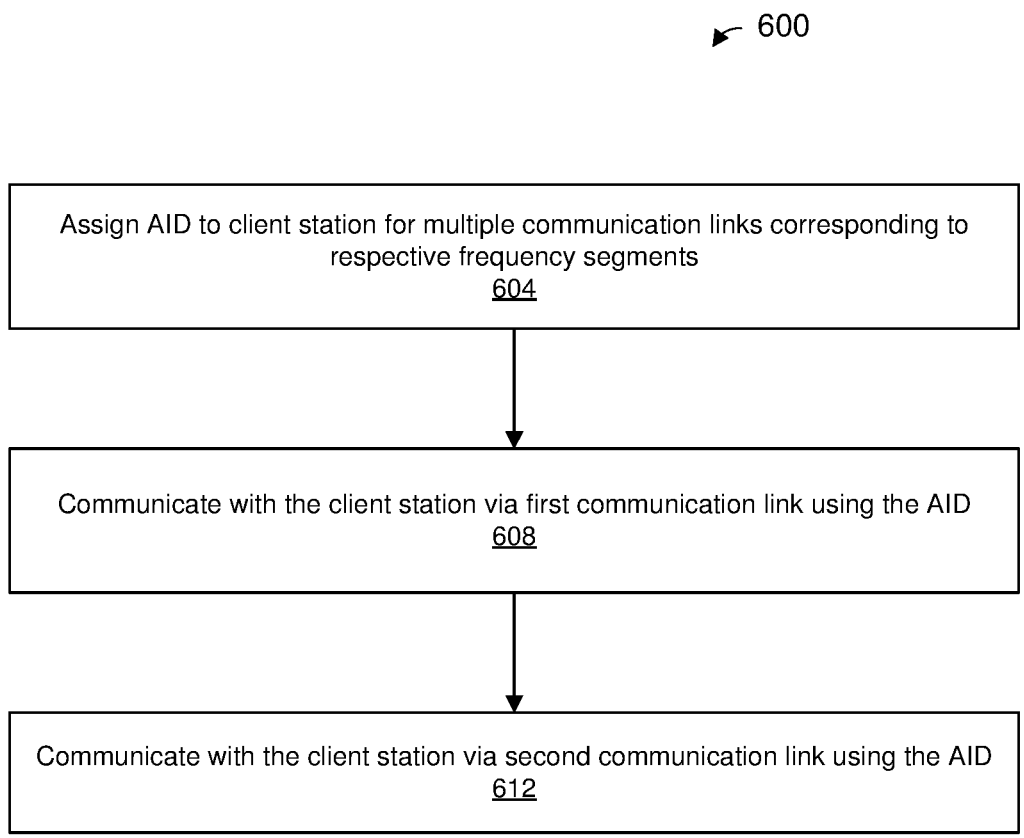
FIG. 6 is a flow diagram of another example method, implemented by one or more communication devices of the communication system of FIG. 1, for simultaneously communicating in multiple frequency segments corresponding to respective communication links, according to another embodiment.

FIG. 6 is a flow diagram of another example method 600 for simultaneously communicating in multiple frequency segments corresponding to respective communication links, according to another embodiment. In some embodiments, the AP 114 of FIG. 1 and/or the network interface device 300 of FIG. 3 is/are configured to implement the method 600, and FIG. 6 is described with reference to FIGS. 1 and 3 merely for explanatory purposes. In other embodiments, the method 600 is implemented by another suitable communication device.

At block 604, the AP 114 assigns (e.g., the network interface device 122 assigns, the MAC processor 126 assigns, the AID assignment controller 142 assigns, the network interface device 300 assigns, the common MAC logic 312 assigns, etc.) a single AID to a client station for communications in multiple communication links. In some embodiments, assigning the AID to the client station at block 604 includes the AP 114 transmitting (e.g., the network interface device 122 transmitting, the PHY processor 130 transmitting, the network interface device 300 transmitting, etc.) in the first communication link a frame that includes an indication of an assignment of the AID to the client station.

At block 608, the AP 114 uses (e.g., the network interface device 122 uses, the network interface device 300 uses, etc.) the AID assigned at block 604 when communicating with the client station via a first communication link among the multiple communication links. In an embodiment, using the AID when communicating via the first communication link at block 608 comprises generating and transmitting (e.g., the network interface device 122 generates and transmits, the PHY processor 130 generates and transmits, the network interface device 300 generates and transmits, etc.) via the first communication link packets that include the AID in the packets. In an embodiment, using the AID when communicating via the first communication link at block 608 comprises receiving (e.g., the network interface device 122 receives, the PHY processor 130 receives, the network interface device 300 receives, etc.) via the first communication link packets that include the AID in the packets.

In an embodiment, using the AID when communicating via the first communication link at block 608 comprises transmitting or receiving (e.g., the network interface device 122 transmits or receives, the PHY processor 130 transmits or receives, the network interface device 300 transmits or receives, etc.) a packet that includes the AID in a PHY preamble of the packet. For example, the AID is included as part of allocation information in the PHY preamble that indicates frequency resource units and/or spatial streams that have been assigned to the client station.

In another embodiment, using the AID when communicating via the first communication link at block 608 comprises transmitting or receiving (e.g., the network interface device 122 transmits or receives, the PHY processor 130 transmits or receives, the network interface device 300 transmits or receives, etc.) a packet that includes the AID in a PHY data portion of the packet. For example, the AID is included in group assignment information indicating that the AP 114 assigned the client station to a group of client stations, according to an embodiment. As another example, the AID is included in a trigger frame configured to prompt the client station to transmit a packet in response to the trigger frame, according to an embodiment.

At block 612, the AP 114 uses (e.g., the network interface device 122 uses, the network interface device 300 uses, etc.) the AID assigned at block 604 when communicating with the client station via a second communication link among the multiple communication links. In an embodiment, using the AID when communicating via the second communication link at block 612 comprises generating and transmitting (e.g., the network interface device 122 generates and transmits, the PHY processor 130 generates and transmits, the network interface device 300 generates and transmits, etc.) via the second communication link packets that include the AID in the packets. In an embodiment, using the AID when communicating via the second communication link at block 612 comprises receiving (e.g., the network interface device 122 receives, the PHY processor 130 receives, the network interface device 300 receives, etc.) via the second communication link packets that include the AID in the packets.

In an embodiment, using the AID when communicating via the second communication link at block 612 comprises transmitting or receiving (e.g., the network interface device 122 transmits or receives, the PHY processor 130 transmits or receives, the network interface device 300 transmits or receives, etc.) a packet that includes the AID in a PHY preamble of the packet. For example, the AID is included as part of allocation information in the PHY preamble that indicates frequency resource units and/or spatial streams that have been assigned to the client station.

In another embodiment, using the AID when communicating via the second communication link at block 612 comprises transmitting or receiving (e.g., the network interface device 122 transmits or receives, the PHY processor 130 transmits or receives, the network interface device 300 transmits or receives, etc.) a packet that includes the AID in a PHY data portion of the packet. For example, the AID is included in group assignment information indicating that the AP 114 assigned the client station to a group of client stations, according to an embodiment. As another example, the AID is included in a trigger frame configured to prompt the client station to transmit a packet in response to the trigger frame, according to an embodiment.

In some embodiments, the client station has multiple different MAC addresses corresponding to respective communication links, whereas the same AID is used with all of the communication links. For example, the client station has a first MAC address corresponding to the first communication link and a second MAC address (different than the first MAC address) corresponding to the second communication link, while the same AID is used at blocks 608 and 612 with the first and second communication links.

Figure 7:
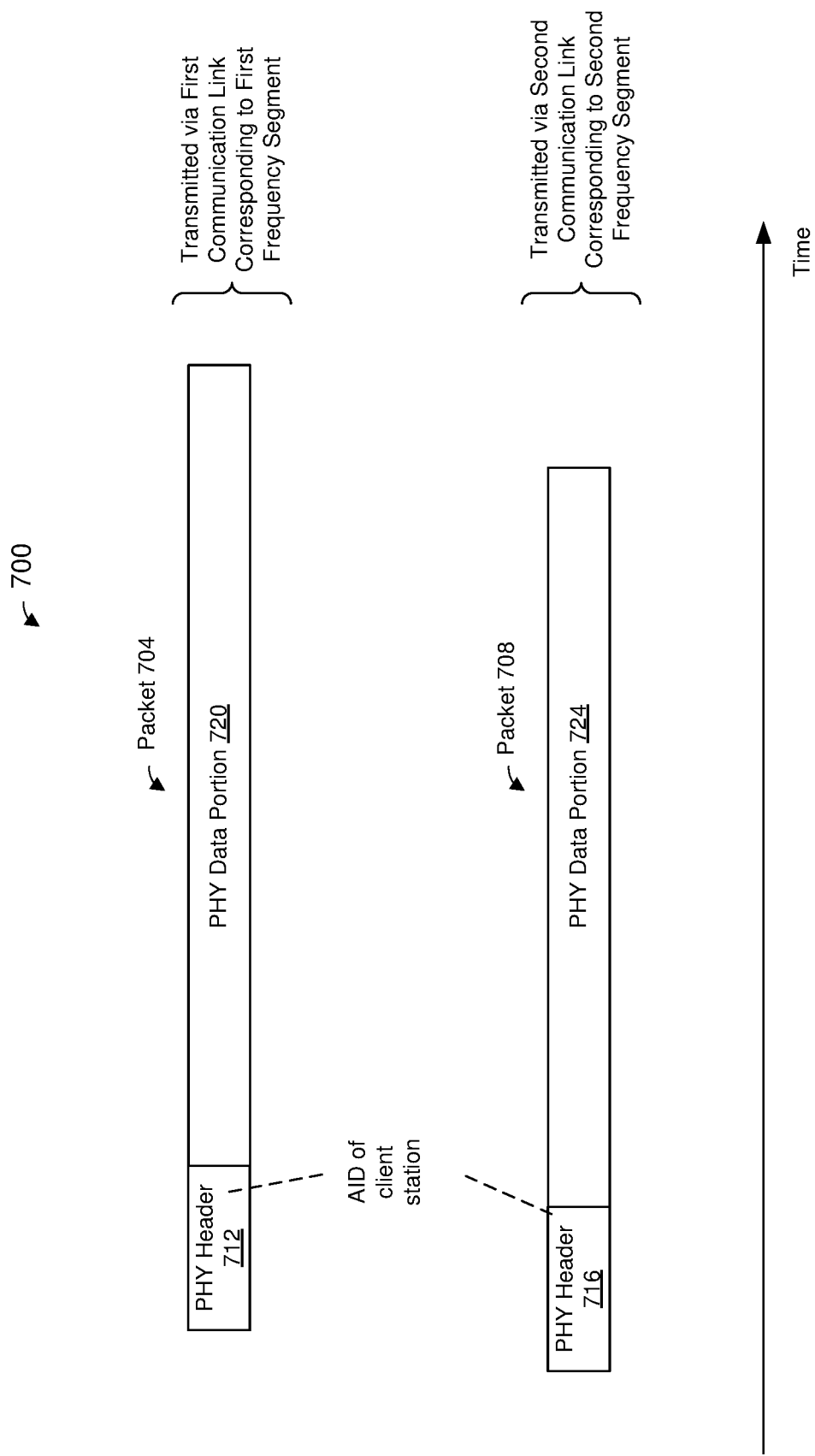
FIG. 7 is a diagram of other example transmissions via multiple frequency segments corresponding to respective communication links performed in connection with the method of FIG. 6, according to another embodiment.

FIG. 7 is a diagram of example transmissions 700 via multiple frequency segments corresponding to respective communication links, according to an embodiment. The example transmissions 700 are an illustrative example of i) using an AID when communicating via the first communication link at block 608 (FIG. 6), and ii) using the same AID when communicating via the second communication link at block 612 (FIG. 6), according to an embodiment.

A first packet 704 is transmitted via a first communication link corresponding to a first frequency segment, and a second packet 708 is transmitted via a second communication link corresponding to a second frequency segment. Transmission of the first packet 704 overlaps in time with transmission of the second packet 708. In an embodiment, the AP 114 transmits the first packet 704 and the second packet 708. In another embodiment, the AP 114 transmits the first packet 704 and receives the second packet 708.

The first packet 704 includes a PHY header 712, and the second packet 708 includes a PHY header 716. The PHY header 712 of the first packet 704 includes an AID, and the PHY header 716 of the second packet 708 includes the AID, according to an embodiment.

Although FIG. 7 was described as including the AID in the PHY headers 712/716 of the packets 704/708, the AP 114 includes the AID in a PHY data portion 720 of the first packet 704 and in a PHY data portion 724 of the second packet 708, according to other embodiments.

Although FIGS. 6 and 7 were described in the context of two communication links in two frequency segments, the AP 114 assigns the same AID to a client station to three or more communication links corresponding to three or more frequency segments, and uses the AID when communicating via the three or more communication links, according to other embodiments.

Figure 8:
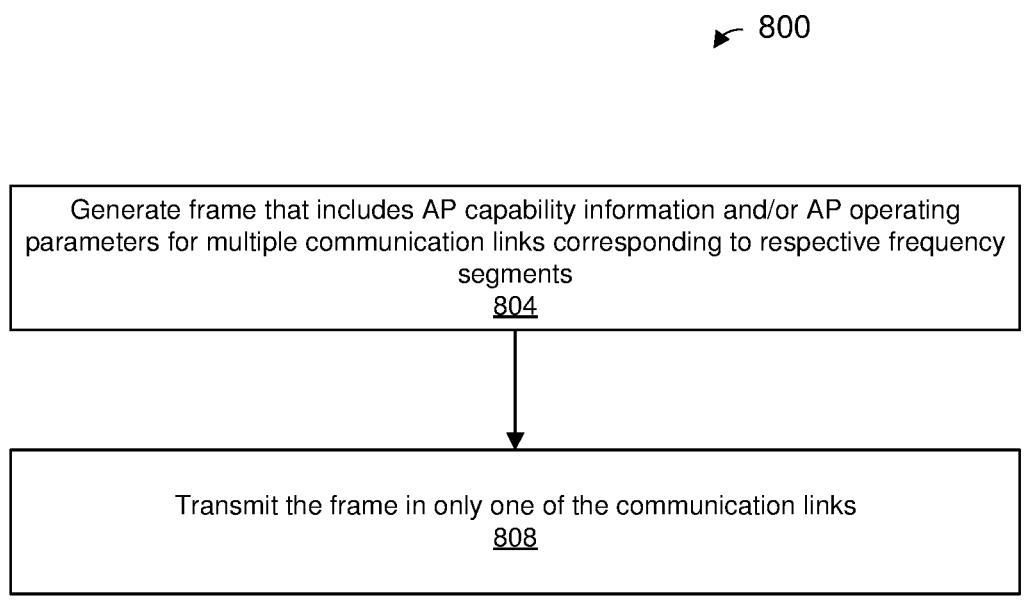
FIG. 8 is a flow diagram of an example method, implemented by one or more communication devices of the communication system of FIG. 1, for communicating capability information and/or operating parameters corresponding to multiple communication links, according to another embodiment.

FIG. 8 is a flow diagram of an example method 800 for communicating AP capability information and/or AP operating parameters corresponding to multiple communication links, according to another embodiment. In some embodiments, the AP 114 of FIG. 1 and/or the network interface device 300 of FIG. 3 is/are configured to implement the method 800, and FIG. 8 is described with reference to FIGS. 1 and 3 merely for explanatory purposes. In other embodiments, the method 800 is implemented by another suitable communication device.

At block 804, the AP 114 generates (e.g., the network interface device 122 generates, the MAC processor 126 assigns, the beacon frame generator 146 generates, the network interface device 300 generates, the common MAC logic 312 generates, etc.) a frame that includes AP capability information and/or AP operating parameters corresponding to multiple communication links. In some embodiments, generating the frame at block 804 includes the AP 114 generating (e.g., the network interface device 122 generates, the MAC processor 126 assigns, the beacon frame generator 146 generates, the network interface device 300 generates, the common MAC logic 312 generates, etc.) a beacon frame that includes AP capability information and/or AP operating parameters corresponding to multiple communication links.

Examples of AP capability information corresponding to a particular communication link include one or more of i) a maximum number of spatial streams that the AP is capable of transmitting in the particular communication link, ii) a maximum number of spatial streams that the AP is capable of receiving in the particular communication link, iii) modulation and coding schemes (MCSs) that the AP is capable of using in the particular communication link, etc., according to various embodiments. Examples of AP capability information corresponding to a particular communication link include one or more of i) a BSS color ID for the particular communication link, ii) an indication of the frequency bandwidth of the particular communication link, iii) an indication of which subchannel in the communication link corresponds to a primary subchannel for the communication link, iv) an indication of one or more punctured subchannels (if any) within the communication link, v) an indication of a set of MCSs that can be used for transmissions via the communication link, etc., according to various embodiments.

In an embodiment, generating the frame at block 804 includes the AP 114 generating (e.g., the network interface device 122 generates, the MAC processor 126 assigns, the beacon frame generator 146 generates, the network interface device 300 generates, the common MAC logic 312 generates, etc.) a frame that includes a multiple BSS identifier (BSSID) element having AP capability information and/or AP operating parameters corresponding to multiple communication links.

In some embodiments, the AP supports multiple virtual access points ("virtual APs" or "VAPs") operating in a same frequency bandwidth, which correspond to multiple BSSs, and AP capability information and/or AP operating parameters regarding the multiple virtual APs is provided in the multiple BSSID element. In an embodiment, when the beacon frame includes a multiple BSSID element having AP capability information and/or AP operating parameters for a virtual AP in a particular communication link, the multiple BSSID element also includes AP capability information and/or AP operating parameters for one or more other virtual APs (if any) in one or more other communication links.

At block 808, the AP 114 transmits (e.g., the network interface device 122 transmits, the PHY processor 130 transmits, the network interface device 300 transmits, etc.) the frame generated at block 804 in only a single communication link among the multiple communication links.

In some embodiments, the method 800 is performed multiple times and multiple frames such as the frame generated at block 804 are transmitted in the same communication link (block 808) while the multiple communication links are established. In some embodiments, the method 800 is performed multiple times to generate respective beacon frames corresponding to respective communication links, and the respective beacon frames are transmitted in the respective communication links. For example, the AP 114 generates a first beacon frame corresponding to a first communication link and generates a second beacon frame corresponding to a second communication link; the first beacon frame is transmitted via only the first communication link, and the second beacon frame is transmitted via only the second communication link; and the first beacon frame includes AP capability information and/or AP operating parameters corresponding to at least the first communication link and the second communication link, and the second beacon frame includes AP capability information and/or AP operating parameters corresponding to at least the first communication link and the second communication link, according to an illustrative embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously communicating in multiple frequency segments corresponding to respective communication links, the method comprising:
    assigning, at a first communication device, a first basic service set (BSS) color identifier (ID) to a first communication link among the multiple communication links;
    assigning, at the first communication device, a second BSS color ID to a second communication link among the multiple communication links;
    assigning, at the first communication device, an association identifier (AID) to a second communication device, the AID to be used for communication in the first communication link and the second communication link;
    using, at the first communication device, the first BSS color ID and the AID when communicating with the second communication device via the first communication link, wherein communicating with the second communication device via the first communication link includes transmitting, from the first communication device to the second communication device via the first communication link, a first physical layer protocol data unit (PPDU) addressed to the second communication device, the first PPDU including a first physical layer (PHY) preamble that includes the first BSS color ID; and
    using, at the first communication device, the second BSS color ID and the AID when communicating with the second communication device via the second communication link, wherein communicating with the second communication device via the second communication link includes one of i) transmitting, from the first communication device to the second communication device via the second communication link, a second PPDU addressed to the second communication device, the second PPDU addressed to the second communication device having a second PHY preamble that includes the second BSS color ID, or ii) receiving, at the first communication device from the second communication device via the second communication link, a second PPDU addressed to the first communication device, the second PPDU addressed to the first communication device having a third PHY preamble that includes the second BSS color ID;
    wherein transmitting the first PPDU to the second communication device via the first communication link overlaps in time with the one of transmitting the second PPDU to the second communication device via the second communication link or receiving the second PPDU from the second communication device via the second communication link.

2. The method of claim 1, wherein:
assigning the first BSS color ID to the first communication link includes transmitting, by the first communication device, via the first communication link a first frame that includes an indication of an assignment of the first BSS color ID to the first communication link; and
assigning the second BSS color ID to the second communication link includes transmitting, by the first communication device, via the second communication link a second frame that includes an indication of an assignment of the second BSS color ID to the second communication link.

3. The method of claim 2, wherein:
transmitting the first frame includes transmitting a first beacon frame via the first communication link, the first beacon frame including the indication of the assignment of the first BSS color ID to the first communication link; and
transmitting the second frame includes transmitting a second beacon frame via the second communication link, the second beacon frame including the indication of the assignment of the second BSS color ID to the second communication link.

4. The method of claim 1, wherein:
using the second BSS color ID when communicating via the second communication link overlaps in time with using the first BSS color ID when communicating via the first communication link.

5. The method of claim 4, wherein:
using the second BSS color ID when communicating via the second communication link comprises, while transmitting the first PPDU via the first communication link, transmitting, by the first communication device, the second PPDU addressed to the second communication device via the second communication link.

6. The method of claim 4, wherein:
using the second BSS color ID when communicating via the second communication link comprises, while transmitting the first PPDU via the first communication link, receiving, at the first communication device, the second PPDU addressed to the first communication device via the second communication link.

7. The method of claim 1, further comprising:
assigning, by the first communication device, a third BSS color ID to the first communication link without changing the assignment of the second BSS color ID to the second communication link.

8. A first communication device, comprising:
a wireless network interface device that is configured to communicate via multiple frequency segments, the wireless network interface device having one or more integrated circuit (IC) devices configured to:
assign a first basic service set (BSS) color identifier (ID) to a first communication link among multiple communication links corresponding to respective frequency segments,
assign a second BSS color ID to a second communication link among the multiple communication links,
assign an association identifier (AID) to a second communication device, the AID to be used for communication in the first communication link and the second communication link,
use the first BSS color ID and the AID when communicating with the second communication device via the first communication link, wherein communicating with the second communication device via the first communication link includes transmitting, from the first communication device to the second communication device via the first communication link, a first physical layer protocol data unit (PPDU) addressed to the second communication device, the first PPDU including a first physical layer (PHY) preamble that includes the first BSS color ID, and
use the second BSS color ID and the AID when communicating with the second communication device via the second communication link, wherein communicating with the second communication device via the second communication link includes one of i) transmitting, from the first communication device to the second communication device, a second PPDU addressed to the second communication device, the second PPDU addressed to the second communication device having a second PHY preamble that includes the second BSS color ID, or ii) receiving, at the first communication device from the second communication device, a second PPDU addressed to the first communication device, the second PPDU addressed to the first communication device having a third PHY preamble that includes the second BSS color ID, and wherein transmitting the first PPDU to the second communication device via the first communication link overlaps in time with the one of transmitting the second PPDU to the second communication device via the second communication link or receiving the second PPDU from the second communication device via the second communication link.

9. The first communication device of claim 8, wherein the one or more IC devices are configured to:
transmit, via the first communication link, a first frame that includes an indication of an assignment of the first BSS color ID to the first communication link; and
transmit, via the second communication link, a second frame that includes an indication of an assignment of the second BSS color ID to the second communication link.

10. The first communication device of claim 9, wherein the one or more IC devices are configured to:
transmit the first frame as a first beacon frame transmitted via the first communication link, the first beacon frame including the indication of the assignment of the first BSS color ID to the first communication link; and
transmit the second frame as a second beacon frame transmitted via the second communication link, the second beacon frame including the indication of the assignment of the second BSS color ID to the second communication link.

11. The first communication device of claim 8, wherein the one or more IC devices are configured to:
use the second BSS color ID when communicating via the second communication link during a same time period as using the first BSS color ID when communicating via the first communication link.

12. The first communication device of claim 11, wherein the one or more IC devices are configured to:
while transmitting the first PPDU via the first communication link, transmit the second PPDU addressed to the second communication device via the second communication link.

13. The first communication device of claim 11, wherein the one or more IC devices are configured to:
while transmitting the first PPDU via the first communication link, receive the second PPDU addressed to the first communication device via the second communication link.

14. The first communication device of claim 8, wherein the one or more IC devices are configured to:
assign a third BSS color ID to the first communication link without changing the assignment of the second BSS color ID to the second communication link.

* * * * *